US008797458B2

(12) United States Patent
Kondo

(10) Patent No.: US 8,797,458 B2
(45) Date of Patent: Aug. 5, 2014

(54) IMAGE DISPLAY APPARATUS AND IMAGE PROCESSING APPARATUS

(75) Inventor: Yoshitake Kondo, Kanagawa (JP)

(73) Assignee: Sony Corporation (JP)

( * ) Notice: Subject to any disclaimer, the term of this patent is extended or adjusted under 35 U.S.C. 154(b) by 1319 days.

(21) Appl. No.: 12/229,795

(22) Filed: Aug. 27, 2008

(65) Prior Publication Data

US 2009/0059098 A1    Mar. 5, 2009

(30) Foreign Application Priority Data

Aug. 31, 2007  (JP) ................ P2007-226321

(51) Int. Cl.
    *H04N 7/01*      (2006.01)
    *H04N 11/20*     (2006.01)
    *H04N 5/765*     (2006.01)

(52) U.S. Cl.
    USPC .......................... 348/441; 386/232

(58) Field of Classification Search
    USPC ................. 348/441, 448; 386/232, 131
    See application file for complete search history.

(56) References Cited

U.S. PATENT DOCUMENTS

| 6,144,410 | A  * | 11/2000 | Kikuchi et al. ............... 348/441 |
| 6,222,589 | B1 * | 4/2001  | Faroudja et al. ............. 348/448 |
| 6,262,774 | B1 * | 7/2001  | Schu et al. .................... 348/448 |
| 6,573,941 | B1 * | 6/2003  | Willis et al. .................. 348/448 |
| 7,453,519 | B2 * | 11/2008 | Kubota et al. ................ 348/459 |
| 8,174,614 | B2 * | 5/2012  | Asamura et al. ............. 348/448 |
| 2004/0136686 | A1 * | 7/2004 | Kono et al. ..................... 386/46 |
| 2005/0265448 | A1 * | 12/2005 | Nozawa ................... 375/240.12 |
| 2006/0215707 | A1 * | 9/2006 | Tsai et al. ...................... 370/535 |
| 2008/0151103 | A1 * | 6/2008 | Asamura et al. ............. 348/448 |

FOREIGN PATENT DOCUMENTS

| JP | 2001333391 A    | 11/2001 |
| JP | 2004-023673 A   | 1/2004  |
| JP | 2005301307 A    | 10/2005 |
| JP | 2007047476 A  * | 2/2007  |
| WO | WO 2006095470 A1 * | 9/2006 |

OTHER PUBLICATIONS

Office Action from Japanese Application No. 2007-226321, dated Feb. 14, 2012.

* cited by examiner

*Primary Examiner* — Pinkal R Chokshi
(74) *Attorney, Agent, or Firm* — Lerner, David, Littenberg, Krumholz & Mentlik, LLP

(57) ABSTRACT

An image display apparatus includes: rate multiplication section multiplying frame rate of input image by 2n (n is a natural number), the input image being generated through a process including a frame rate conversion from cinema image to television image, the frame rate conversion being performed so that two consecutive frames of cinema image are treated as a unit; replacement section replacing, with n frames of first image, n frames of second image which come immediately after a switch position from the first image to the second image in a sequence of image frames with a rate multiplied by the rate multiplication section, the first image and the second image corresponding to first half and latter half of the unit of the cinema image, respectively; and display section displaying image outputted from the replacement section.

8 Claims, 4 Drawing Sheets

IMAGE DISPLAY APPARATUS AND IMAGE PROCESSING APPARATUS

CROSS-REFERENCE TO RELATED APPLICATIONS

The present application claims priority from Japanese Patent Application No. JP 2007-226321, filed in the Japanese Patent Office on Aug. 31, 2007, the entire content of which is incorporated herein by reference.

BACKGROUND OF THE INVENTION

1. Field of the Invention

The present invention relates to an image display apparatus and an image processing apparatus applied to liquid crystal projectors and the like.

2. Description of the Related Art

Projection display apparatuses such as liquid crystal projectors have been widely used which are configured to perform image display by applying spatial modulation to the light passing through a spatial light modulation element, and emitting the light thus modulated, and then collecting and projecting the emitted light in response to the electric signal supplied to the spatial light modulation element. These projection display apparatus generally have a lamp and a focusing mirror as a light source, and an illumination optical system for collecting and admitting the light therefrom into the spatial light modulation element. The light from the spatial light modulation element is projected onto a screen or the like by a projection lens. The projection display apparatus thus configured is used to display, for example, cinema images.

Cinema images as being cinema source are usually recorded at a 24 Hz frame rate. On the other hand, the 24 Hz frame rate is too low to directly display these images on TV sets and thus it is difficult to display these images as it is. Therefore, recording media such as DVDs (digital versatile disks) record the image composed of two 60 Hz frames and three 60 Hz frames (60×5 Hz) generated by applying telecine conversion to two 24 Hz frames (24×2 Hz) in the original image. Here, telecine conversion means a conversion process which converts cinema video signal to television video signal. By using the image after being subjected to the above television-cinema conversion, the frame rate becomes 60 Hz, making it possible to view the cinema on the TV sets and the like (for example, refer to Japanese Unexamined Patent Application Publication No. 2004-23673).

SUMMARY OF THE INVENTION

However, in the image after being subjected to television-cinema conversion, the first half frame in the two frames of the original image is displayed two times, and the second half frame is displayed three times. Therefore, the display time of the first half and that of the second half are different from each other (the display time ratio is 2:3), and the original image (the cinema image) in moving images will lose its smoothness, making it difficult to faithfully reproduce the moving images. Hence, there is room for improvement.

This issue is not limited to the projection display apparatuses. The same is true for direct-view type display apparatuses such as liquid crystal television sets.

It is desirable to provide an image display apparatus and an image processing apparatus capable of more faithfully reproducing the moving images in the original image composed of cinema images.

According to an embodiment of the invention, there is provided an image display apparatus including: rate multiplication means for multiplying frame rate of input image by 2n (n is a natural number), the input image being generated through a process including a frame rate conversion from cinema image to television image, the frame rate conversion being performed so that two consecutive frames of cinema image are treated as a unit; replacement means for replacing, with n frames of first image, n frames of second image which come immediately after a switch position from the first image to the second image in a sequence of image frames with a rate multiplied by the rate multiplication means, the first image and the second image corresponding to first half and latter half of the unit of the cinema image, respectively; and display means for displaying image outputted from the replacement means.

According to an embodiment of the invention, there is provided an image processing apparatus applying image processing to the above-mentioned input image, and including the above-mentioned rate multiplication means and the above-mentioned replacement means.

In the image display apparatus and the image processing apparatus according to the embodiment of the invention, the rate multiplication process of multiplying frame rate of input image by 2n (n is a natural number) is performed on the input image being generated through a process including a frame rate conversion from cinema image to television image, and after that the replacement process of replacing, with n frames of first image, n frames of second image which come immediately after a switch position from the first image to the second image in a sequence of image frames with a rate multiplied by the rate multiplication process, the first image and the second image corresponding to first half and latter half of the unit of the cinema image, respectively is performed. Hence, the first image and the second image have the same proportion of time in the replaced image, and thus being identical with that in the input image.

Preferably, the image display apparatus of the embodiment of the invention includes IP conversion means for applying IP conversion to image frames generated through the frame rate conversion, and supplying IP-converted image, as the input image, to the rate multiplication means, in which the above-mentioned replacement means performs the replacement based on a film detection synchronizing signal used during the IP conversion.

Therefore, by using the film detection synchronizing signal used for the IP conversion, the replacement process is able to be facilitated and the configuration of the replacement means is able to be simplified.

In accordance with the image display apparatus or the image processing apparatus of the embodiment of the invention, the rate multiplication process of multiplying frame rate of input image is performed on the input image being generated through a process including a frame rate conversion from cinema image to television image, and the replacement process of replacing, with n frames of first image, n frames of second image which come immediately after a switch position from the first image to the second image in a sequence of image frames with a rate multiplied by the rate multiplication process, the first image and the second image corresponding to first half and latter half of the unit of the cinema image, respectively is performed. Therefore, the first image and the second image may have the same proportion of time in the replaced image, and thus being identical with that in the original image. This enables more faithful reproduction of the moving images in the input image including cinema images.

Other and further objects, features and advantages of the invention will appear more fully from the following description.

DESCRIPTION OF THE PREFERRED EMBODIMENTS

Preferred embodiments of the present invention will now be described in detail with reference to the accompanying drawings.

Figure 1:
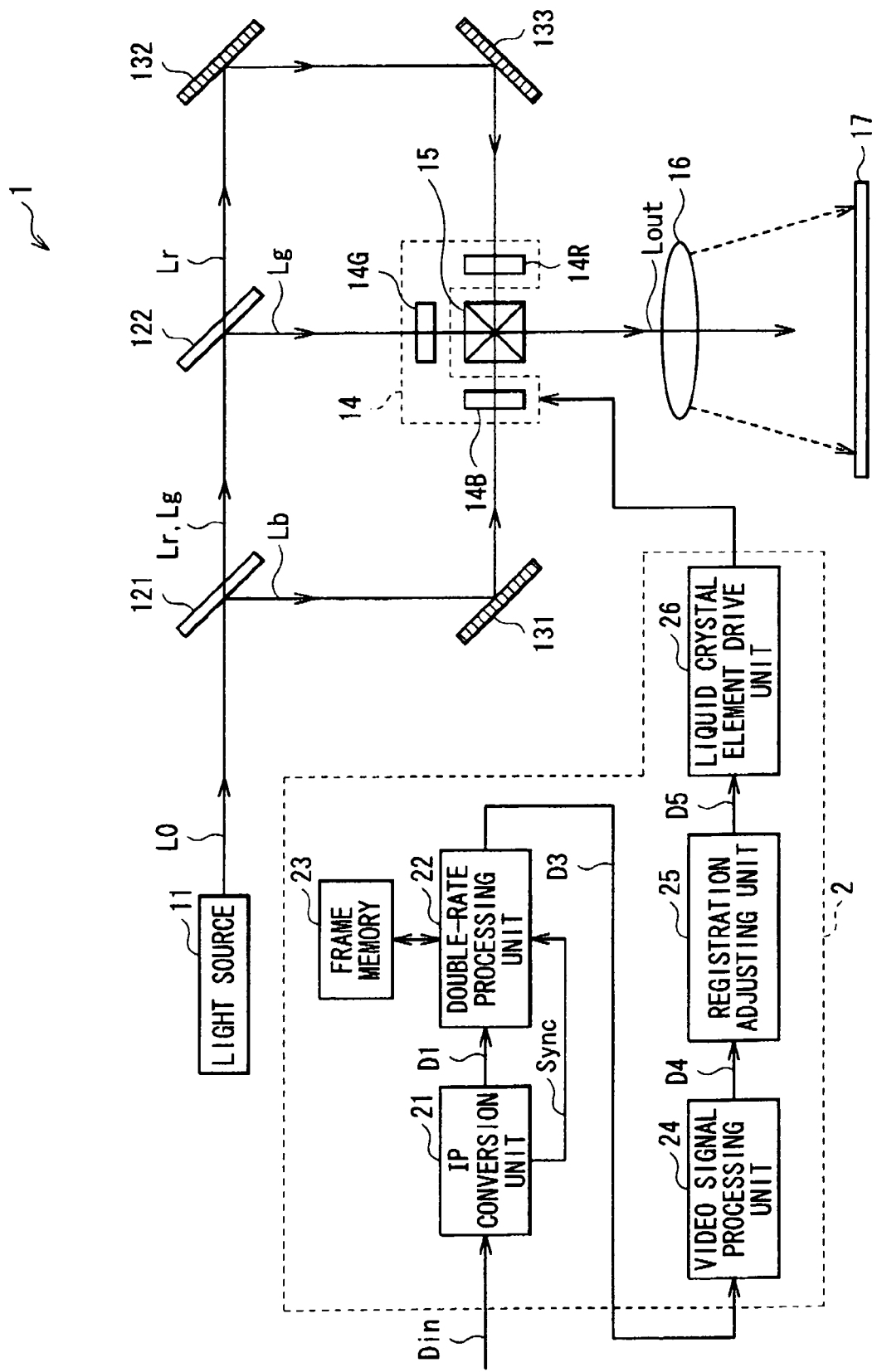
FIG. 1 is a block diagram showing the configuration of an image display apparatus according to an embodiment of the invention.

FIG. 1 shows the overall configuration of an image display apparatus (a liquid crystal projector 1) according to an embodiment of the invention. The liquid crystal projector 1 performs image display based on an input video signal Din supplied from the external, and includes a light source 11, dichroic mirrors 121 and 122, reflection mirrors 131, 132 and 133, a light modulator 14, a dichroic prism 15, a projection lens 16, a screen 17, and a controller 2 to control the light modulator 14 based on the input video signal Din. The input video signal Din corresponds to the image generated by applying television-cinema conversion to an original image Dorg composed of cinema images (24 Hz video signals, not shown). Specifically, the input video signal Din is a video signal recorded in recording media such as DVDS, that is, an interlace signal having a 60 Hz frame rate.

The light source 11 emits white light (irradiation light L0) containing the primary colors of light, namely red light Lr, green light Lg and blue light Lb, and is constructed from, for example, a halogen lamp, a metal halide lamp or a xenon lamp.

The dichroic mirror 121 transmits the red light Lr and the green light Lg and reflects the blue light Lb in the irradiation light L0 emitted from the light source 11, causing the red light Lr and the green light Lg to travel separately from the blue light Lb. The dichroic mirror 122 transmits the red light Lr from among the red light Lr and the green light Lg passed through the dichroic mirror 121, and reflects the green light Lg, causing the red light Lr and the green light Lg to travel separately from each other. The green light Lg reflected by the dichroic mirror 122 travels toward the light modulator 14.

The reflection mirror 131 causes the blue light Lb reflected by the dichroic mirror 121 to be reflected toward the light modulator 14. The reflection mirrors 132 and 133 cause the red light Lr reflected by the dichroic mirror 122 to be reflected toward the light modulator 14.

The light modulator 14 includes three liquid crystal elements 14R, 14G and 14B corresponding to these three primary colors of light, namely the red light Lr, the green light Lg and the blue light Lb, and modulates per primary color of light the irradiation light emitted from the light source 11, based on the video signals for their respective lights supplied from the controller 2.

Specifically, the liquid crystal element 14R is disposed between the reflection mirror 133 and the dichroic prism 15, and modulates the incident red light Lr based on the video signal for red color supplied from the controller 2. The liquid crystal element 14G is disposed between the dichroic mirror 122 and the dichroic prism 15, and modulates the incident green light Lg based on the video signal for green color supplied from the controller 2. The liquid crystal element 14B is disposed between the reflection mirror 131 and the dichroic prism 15, and modulates the incident blue light Lb based on the video signal for blue color supplied from the controller 2. These liquid crystal elements 14R, 14G and 14B have the configuration that a liquid crystal layer containing liquid crystal molecules is disposed between a pair of substrates, to which a drive voltage based on a video signal is applied.

The dichroic prism 15 generates a mixed light (a display light) Lout by mixing the red light Lr, the green light Lg and the blue light Lb modulated by the liquid crystal elements 14R, 14G and 14B, respectively, and causes the display light Lout to travel toward an optical path (the optical path toward the projection lens 16).

The projection lens 16 is arranged between the dichroic prism 15 and the screen 17, and projects the display light Lout generated by the dichroic prism 15 onto the screen 17. That is, the display light Lout modulated by the liquid crystal elements 14R, 14G and 14B is projected onto the screen 17 by the projection lens 16.

The controller 2 has an IP conversion unit 21, a double-rate processing unit 22, a frame memory 23, a video signal processing unit 24, a registration adjusting unit 25 and a liquid crystal element drive unit 26.

The IP conversion unit 21 performs IP conversion, including film detection and film conversion, to convert an input video signal Din as being an interlace signal having a 60 Hz frame rate to a non-interlace signal (a progressive signal) having a 60 Hz frame rate, thereby generating a video signal D1 as an IP-converted progressive signal. The IP conversion unit 21 then supplies the video signal D1 to the double-rate processing unit 22. A film detection synchronizing signal Sync used during the IP conversion by the IP conversion unit 21 is also supplied to the double-rate processing unit 22.

The double-rate processing unit 22 applies double-rate processing to the IP-converted video signal D1 so as to double the frame rate thereof, namely change the 60 Hz frame rate into a 120 Hz frame rate by using the frame memory 23 composed of SRAM (static random access memory) or the like. The frame memory 23 is also used to apply replacement processing described later to a video signal D2 after being subjected to the double-rate processing (not shown in FIG. 1). The double-rate processing and the replacement processing in the double-rate processing unit 22 will be described later in detail.

The video signal processing unit 24 has a function of generating a video signal D4 by applying white balance adjustment and so-called gamma correction for adjusting the color temperature of the video signal, to a video signal D3 after being subjected to the double-rate processing and the replacement processing, supplied from the double-rate processing unit 22. This adjustment improves the image quality of display images.

The registration adjusting unit 25 performs correction (registration adjustment), when misregistration occurs between the primary colors of light Lr, Lg and Lb projected onto the screen 17, to the video signal D4 for each of the colors corresponding to the primary colors of light Lr, Lg and Lb so that the misregistration is reduced in accordance with adjustment values (correction values) inputted by a user. The registration adjusting unit 25 then supplies a post-adjustment video signal D5 for these colors to the liquid crystal element drive unit 26.

The liquid crystal element drive unit 26 drives liquid crystal elements 14R, 14B and 14G, respectively, based on the video signal D5 supplied from the registration adjusting unit 25.

In the present invention, the liquid crystal elements 14R, 14B and 14G correspond to a specific example of "spatial light modulation elements," the projection lens 16 corresponds to a specific example of "projection means," and the double-rate processing unit 22 and the frame memory 23 correspond to a specific example of "double-rate processing means" and "replacement means," respectively, and also a specific example of "image processing apparatus."

Figure 2:
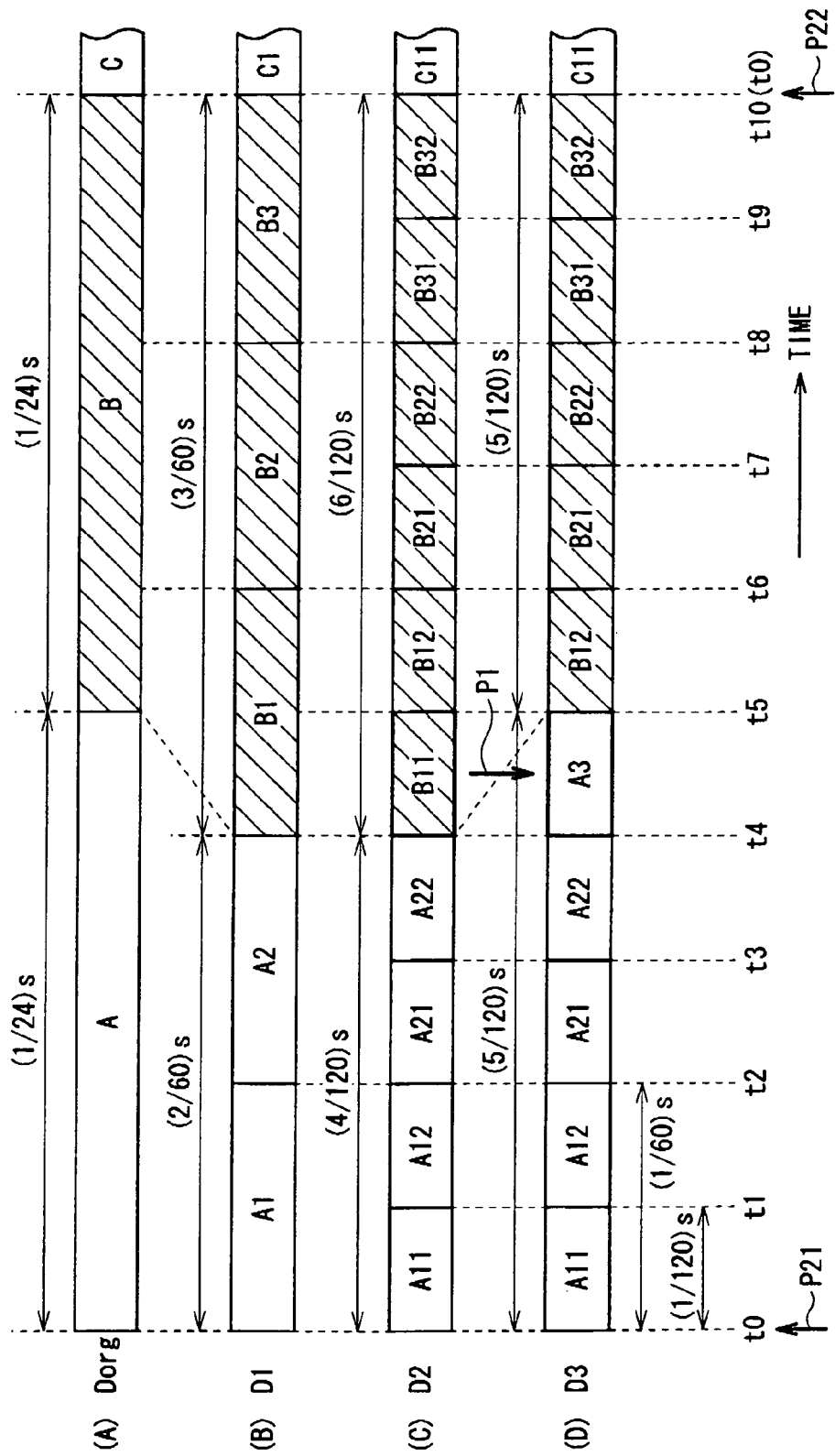
FIG. 2 is a timing chart for explaining an example of image processings in a double-rate processing unit.
Figure 3:
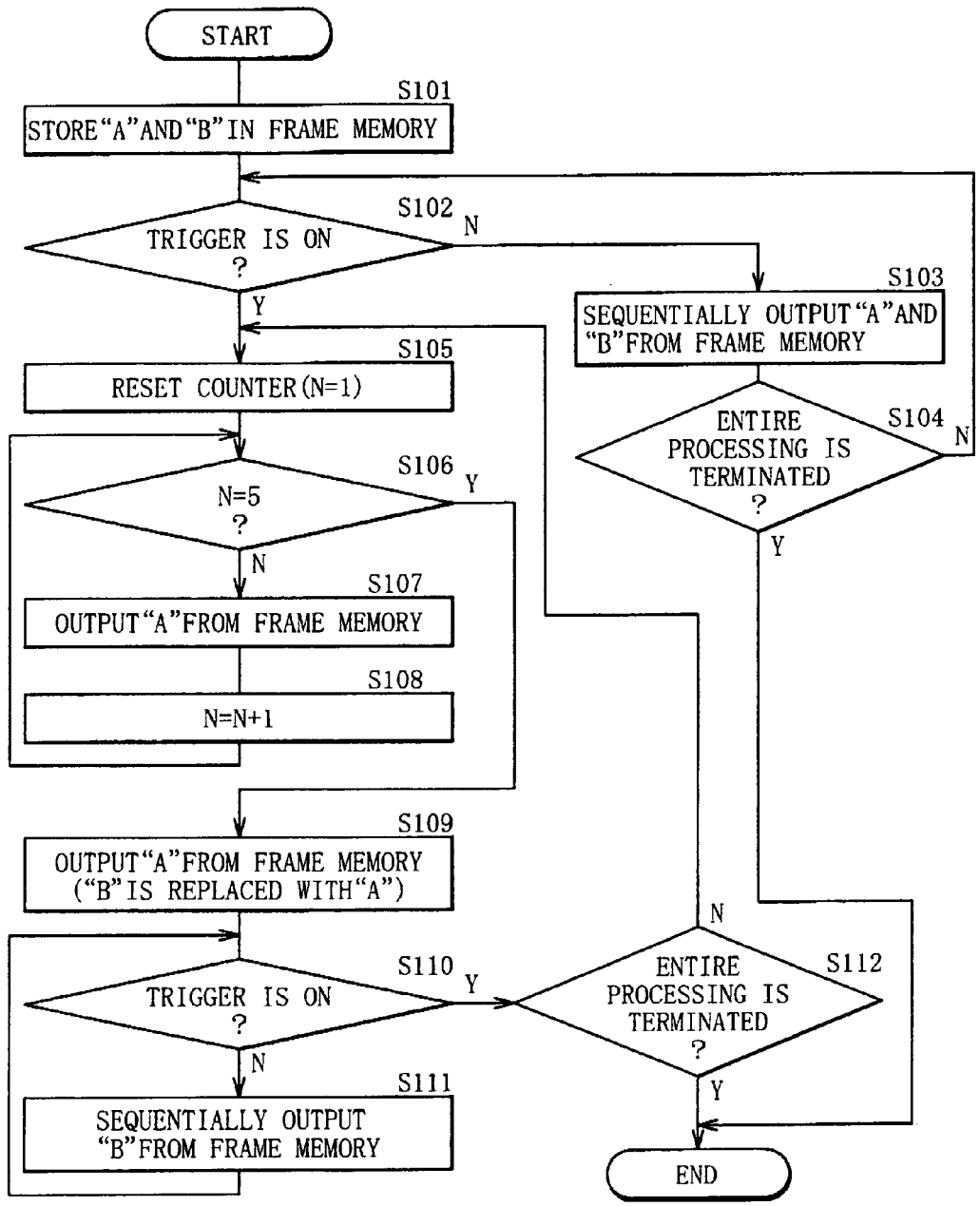
FIG. 3 is a flow chart for explaining an example of the image processings in the double-rate processing unit.

The operation of the liquid crystal projector 1 of the present embodiment will be described in detail with reference to FIGS. 1 to 3. FIG. 2 shows a timing chart showing an example of the image processing by the double-rate processing unit 22 (the double-rate processing and the replacement processing), respectively. That is, (A) in FIG. 2 shows the original video signal Dorg, (B) in FIG. 2 shows an IP-converted video signal D1, (C) in FIG. 2 shows a double-rated video signal D2 after the double-rate processing, and (D) in FIG. 2 shows a replaced video signal D3. FIG. 3 is a flow chart showing an example of the replacement processing by the double-rate processing unit 22.

In the liquid crystal projector 1, as shown in FIG. 1, the irradiation light L0 emitted from the light source 11 is separated into red light Lr and green light Lg, and blue light Lb by the dichroic mirror 121, and further the red light Lr and the green light Lg are separated from each other by the dichroic mirror 122. The separated red light Lr enters through the reflection mirrors 132 and 133 to the liquid crystal element 14R. The separated green light Lg directly enters the liquid crystal element 14G. The separated blue light Lb enters through the reflection mirror 131 to the liquid crystal element 14B. These primary colors of light Lr, Lg and Lb are modulated by the liquid crystal elements 14R, 14G and 14B based on their corresponding video signals, respectively. These primary colors of light Lr, Lg and Lb thus modulated are mixed into a display light Lout by the dichroic prism 15. The display light Lout is then projected onto the screen 17 by the projection lens 16, achieving the image display based on the input video signal Din.

In the controller 2, firstly, the IP conversion unit 21 applies IP conversion using the film detection synchronizing signal Sync to the input video signal Din as being the interlace signal of a 60 Hz frame rate. Thus, the video signal D1 as being non-interlace signal (progressive signal) having the 60 Hz frame rate is generated and supplied to the double-rate processing unit 22.

That is, to the original video signal Dorg (the interlace signal) having as a unit composition, for example, an image A (a first image) and an image B (a second image) corresponding to cinema images of consecutive two frames (24 Hz×2) along the time axis as shown in (A) in FIG. 2, the television-cinema conversion and the IP conversion by the IP conversion unit 21 are applied to generate a video signal D1 having an image "A" composed of two consecutive frames (60Hz×2) along the time axis (namely, images "A1" and "A2" in timings t0 to t4), and an image "B" composed of consecutive three frames (60 Hz×3) along the time axis (namely, images "B1," "B2" and "B3" in timings t4 to t10) as shown in (B) in FIG. 2.

Next, in the double-rate processing unit 22 and the frame memory 23, firstly, double-rate processing is applied to the video signal D1 shown in (B) in FIG. 2 so as to double the frame rate thereof. As a result, the frame rate is switched from 60 Hz to 120 Hz, as in a video signal D2 shown in (C) in FIG. 2. Specifically, there are generated an image "A" composed of four consecutive frames (120 Hz×4) along the time axis (namely, images "A11," "A12," "A21" and "A22" in timings t0 to t4), and an image "B" composed of consecutive six frames (120 Hz×6) along the time axis (namely, images "B11," "B12," "B21," "B22," "B31" and "B32" in timings t4 to t10).

Subsequently, in the double-rate processing unit 22 and the frame memory 23, the replacement processing as shown in (C) and (D) in FIG. 2 and indicated by the arrow P1 therein are performed to generate a video signal D3. Specifically, there are generated an image "A" composed of five consecutive frames (120 Hz×5) along the time axis (namely, images "A11," "A12," "A21," "A22" and "A3" in timings t0 to t5), and an image "B" composed of consecutive five frames (120 Hz×5) along the time axis (specifically, images "B12," "B21," "B22," "B31" and "B32" in timings t5 to t10).

An example of the above-mentioned replacement processing will now be described in detail with reference to FIG. 3. In the replacement processing, firstly, the images "A" and "B" (specifically, the images "A11" and "B11) are stored in the frame memory 23 (step S101). As indicated by the arrows P21 and P22 in FIG. 2, it is judged whether or not the film detection synchronizing signal Sync is held in the ON state (whether or not the trigger is held in the ON state) (step S102). If not ("N" in step S102), the video signal D3 is generated by sequentially outputting the images "A" and "B" from the frame memory 23 (step S103), and it is judged whether or not the entire replacement processing should be terminated (step S104). If not ("N" in step S104), the procedure returns to step S102. If terminated ("Y" in step S104), the entire processing is terminated. On the other hand, when the trigger enters the ON state ("Y" in step S102), the counter (not shown) included in the double-rate processing unit 22 is reset (the count value N is set to a "1") (step S105), and it is judged whether or not the count value N of the counter is five (step S106). If not ("N" in step S106), the video signal D3 is generated by outputting the image "A" from the frame memory 23 (step S107), and a "1" is added to the count value N (N is set to N+1) (step S108), and the procedure returns to step S106. On the other hand, if N is five in step S106 ("Y" in step S106), the image "B" (specifically, the image "B11") is replaced with the image "A" (specifically, the image "A3") by outputting the image "A" from the frame memory 23, as shown by the arrow P1 in (C) and (D) in FIG. 2 (step S109). Then, it is again judged whether or not the film detection synchronizing signal Sync is held in the ON state (whether or not the trigger is held in the ON state) (step S110). If not ("N" in step S110), the video signal D3 is generated by sequentially outputting the image "B" from the frame memory 23 (step S111). On the other hand, when the trigger enters the ON state ("Y" in step S110), it is judged whether or not the entire processing should be terminated (step S112). If not ("N" in step S112), the procedure returns to step S105. If terminated ("Y" in step S112), the entire processing is terminated.

Thus, the double-rate processing unit 22 firstly applies the double-rate processing to the video signal D1 generated by applying IP conversion to the input video signal Din which has been produced by applying telecine conversion to the original video signal Dorg. In the video signal D2 after being subjected to the double-rate processing, the single frame image (the image "B11"), immediately after the image "A" (the first image) is switched to the image "B" (the second image), is replaced with the image "A3" (the first image). Therefore, as shown in (A) and (D) in FIG. 2, in the replaced video signal D3, the image "A" and the image "B" have the same proportion of time, and thus being identical with that in the original video signal Dorg (the ratio of the image "A" to the image "B" is 1:1).

Subsequently, the video signal processing unit 21 generates the video signal D4 by applying white balance adjustment and gamma correction to the video signal D3 thus subjected to the double-rate processing and the replacement processing, supplied from the double-rate processing unit 22. The registration adjusting unit 22 applies correction (registration adjustment) to the video signal D4 in accordance with the adjustment value inputted from the user, and supplies a post-adjustment video signal D5 to the liquid crystal element drive unit 23. In response to the video signal D5, the liquid crystal element drive unit 23 drives the liquid crystal elements 14R, 14G and 14B to modulate the primary colors of light Lr, Lg and Lb, respectively.

In the present embodiment as described above, the double-rate processing is applied to the input video signal generated by applying the television-cinema conversion to the original video signal Dorg (specifically, the video signal D1 generated by applying the IP conversion to the input video signal Din). Further, in the video signal D2 after being subjected to the double-rate processing, the single frame image (the image "B11"), immediately after the image "AA" (the first image) is switched to the image "B" (the second image), is replaced with the image "A3" (the first image). Therefore, in the replaced video signal D3, the image "A" and the image "B" can have the same proportion of time, and thus being identical with that in the original video signal Dorg (the ratio of the image "A" to the image "B" is 1:1). This enables the moving images in the original video signal Dorg composed of cinema images to be reproduced more faithfully than the related art.

The IP conversion unit 21 is provided for applying IP conversion to the video signal (the input video signal Din) generated by applying the television-cinema conversion to the original video signal Dorg, and for supplying the IP-converted video signal D1 to the double-rate processing unit 22. The replacement processing is performed using the film detection synchronizing signal Sync used during the IP conversion by the IP conversion unit 21. This facilitates the replacement processing by the double-rate processing unit 22 and the frame memory 23, enabling simplification of their respective configurations.

Although the present invention has been described above based on the foregoing embodiment, the invention is not limited thereto, and various modifications may be made therein. For example, it is possible to make the following different modifications.

Figure 4:
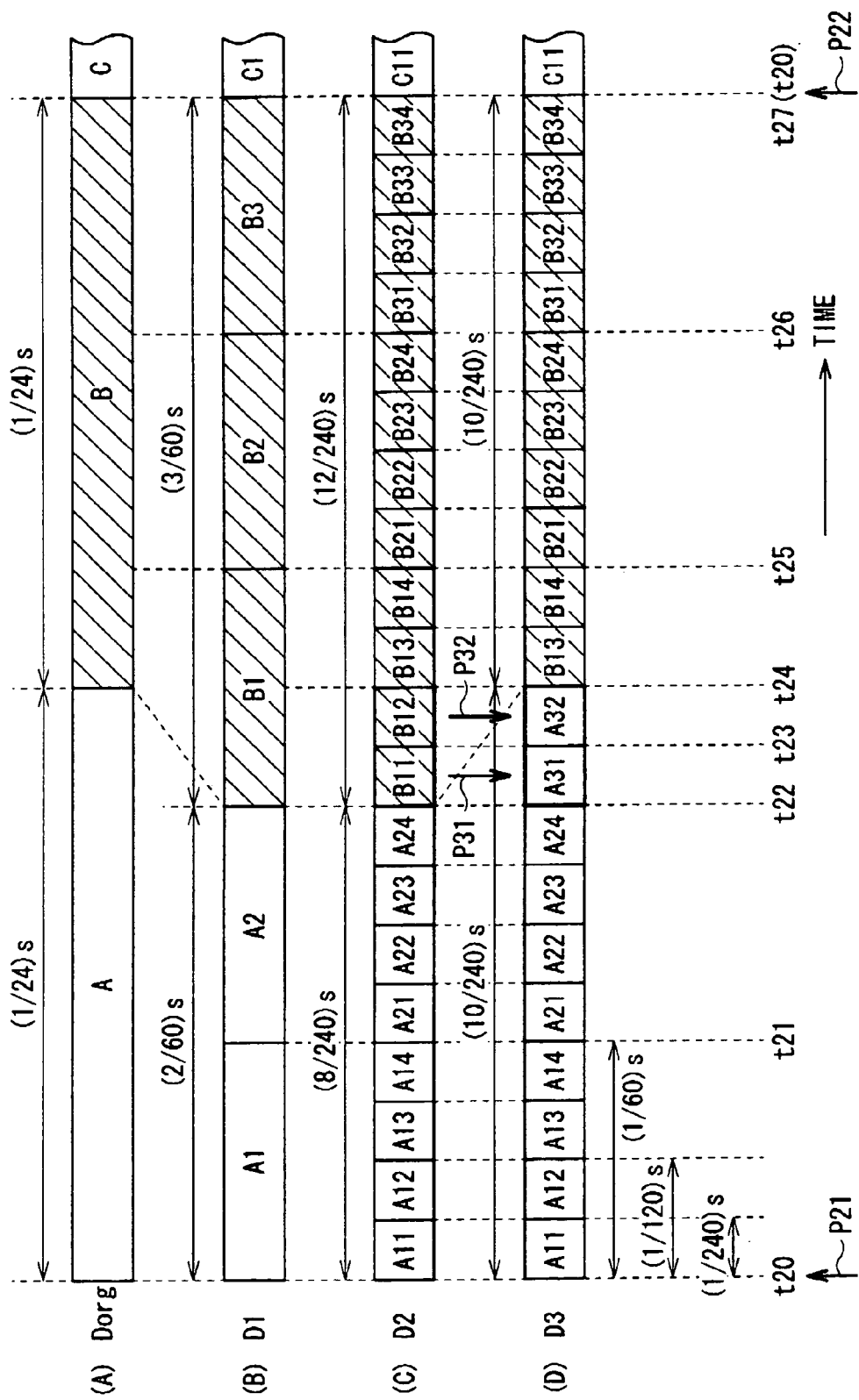
FIG. 4 is a timing chart for explaining an example of image processings according to a modification of the invention.

Instead of the case where the double-rate processing unit 22 performs the double-rate processing for doubling the frame rate of the video signal D1 and performs the replacement processing with respect to the single frame image immediately after the image "A" (the first image) is switched to the image "B" (the second image), the double-rate processing unit 22 may be generally configured to perform 2n double-rate processing for 2n doubling (n is a natural number) the frame rate of the video signal D1, and perform replacement processing with respect to the images of n frames immediately after the image "A" (the first image) is switched to the image "B" (the second image). Specifically, as shown in the arrows P31 and P32 in (A) to (D) in FIG. 4, the double-rate processing unit 22 may perform quadruple-rate processing for quadrupling the frame rate of the video signal D1, and perform replacement processing of replacing, with an image "A3" (the first image), the images of two frames (the images "B11" and "B12") immediately after the image "A" (the first image) is switched to the image "B" (the second image).

Although in the double-rate processing unit 22, the replacement processing is performed using the film detection synchronizing signal Sync for IP conversion supplied from the IP conversion unit 21, instead of using the film detection synchronizing signal Sync, the frame memory 23 may include, for example, a frame memory for ten frames, and the replacement processing may be performed by searching the switching point between the image "A" and the image "B" by checking the video signal D2 in these frames within the frame memory 23.

Although the so-called 3-modulation-panel projection display (projector) has been described above, the present invention is also applicable to projection display of other mode. Instead of the configuration as the projection display apparatus (the liquid crystal projector 1) provided with the projection means (the projection lens 16) for projecting the light modulated by the spatial light modulation elements (the liquid crystal elements 14R, 14G and 14B) onto the screen 17, the present invention may be applied to direct-view type display apparatuses such as TV sets.

Instead of the transmission type liquid crystal display apparatus (the liquid crystal projector 1) using the so-called transmission type spatial light modulation elements (the liquid crystal elements 14R, 14G and 14B), the present invention is also applicable to the reflection type liquid crystal display apparatuses (liquid crystal projectors and the like) using so-called reflection type spatial light modulation elements (liquid crystal elements and the like).

Although in the foregoing embodiment, the spatial light modulation elements are the liquid crystal elements (the liquid crystal elements 14R, 14G and 14B) and configured as the liquid crystal display apparatus (the liquid crystal projector 1), for example, DMDs (digital micromirror devices) may be used as other spatial light modulation elements.

Although the foregoing embodiment has described, as an example of image display apparatuses, the liquid crystal display apparatus (the liquid crystal projector 1) having the light source 11 and the liquid crystal elements 14R, 14G and 14B, the present invention is also applicable to other image display apparatuses such as PDPs (plasma display panels) and ELs (electroluminescence) display apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
   rate multiplication means for multiplying frame rate of input image by 2n (n is a natural number), the input image being generated through a process including a frame rate conversion from cinema image to television image, the frame rate conversion being performed so that two consecutive frames of cinema image are treated as a unit;
   replacement means for replacing, with n frames of first image, n frames of second image which come immediately after a switch position from the first image to the second image in a sequence of image frames with a rate multiplied by the rate multiplication means, based on (i) a determination, for the sequence of image frames with a rate multiplied, indicating a display time of frames of the first image, the first image corresponding to first half of the unit of the cinema image, is different from a display time of frames of the second image, the second image corresponding to latter half of the unit of the cinema image and (ii) a determination of whether a count value that counts the frames of the first image in the sequence of the image frames with the rate multiplied by the rate multiplication means output from the replacement means is equal to a value that is greater than twice 2n; and display means for displaying image outputted from the replacement means.

2. The image display apparatus according to claim 1, further comprising:

IP conversion means for applying IP conversion to image frames generated through the frame rate conversion, and supplying IP-converted image, as the input image, to the rate multiplication means, wherein the replacement means performs the replacement based on a film detection synchronizing signal used during the IP conversion.

3. The image display apparatus according to claim 1, wherein, the rate multiplication means performs double-rate processing for doubling the frame rate of the input image, and the replacement means replaces, with a single frame of the first image, a single frame of the second image which comes immediately after the switch point.

4. The image display apparatus according to claim 1, configured as a liquid crystal display apparatus, wherein the display means has a light source, and a liquid crystal element for modulating light emitted from the light source based on a video signal corresponding to the image outputted from the replacement means.

5. The image display apparatus according to claim 4, configured as a liquid crystal projector, wherein the display means has projection means for projecting light modulated by the liquid crystal element onto a screen.

6. An image processing apparatus comprising:

rate multiplication means for multiplying frame rate of input image by 2n (n is a natural number), the input image being generated through a process including a frame rate conversion from cinema image to television image, the frame rate conversion being performed so that two consecutive frames of cinema image are treated as a unit;

replacement means for replacing, with n frames of first image, n frames of second image which come immediately after a switch position from the first image to the second image in a sequence of image frames with a rate multiplied by the rate multiplication means, based on (i) a determination, for the sequence of image frames with a rate multiplied, indicating a display time of frames of the first image, the first image corresponding to first half of the unit of the cinema image, is different from a display time of frames of the second image, the second image corresponding to latter half of the unit of the cinema image and (ii) a determination of whether a count value that counts the frames of the first image in the sequence of the image frames with the rate multiplied by the rate multiplication means output from the replacement means is equal to a value that is greater than twice 2n.

7. An image display apparatus comprising:

rate multiplication section multiplying frame rate of input image by 2n (n is a natural number), the input image being generated through a process including a frame rate conversion from cinema image to television image, the frame rate conversion being performed so that two consecutive frames of cinema image are treated as a unit;

replacement section replacing, with n frames of first image, n frames of second image which come immediately after a switch position from the first image to the second image in a sequence of image frames with a rate multiplied by the rate multiplication section, based on (i) a determination, for the sequence of image frames with a rate multiplied, indicating a display time of frames of the first image, the first image corresponding to first half of the unit of the cinema image, is different from a display time of frames of the second image, the second image corresponding to latter half of the unit of the cinema image and (ii) a determination of whether a count value that counts the frames of the first image in the sequence of the image frames with the rate multiplied by the rate multiplication section output from the replacement section is equal to a value that is greater than twice 2n; and display section displaying image outputted from the replacement section.

8. An image processing apparatus comprising:

rate multiplication section multiplying frame rate of input image by 2n (n is a natural number), the input image being generated through a process including a frame rate conversion from cinema image to television image, the frame rate conversion being performed so that two consecutive frames of cinema image are treated as a unit;

replacement section replacing, with n frames of first image, n frames of second image which come immediately after a switch position from the first image to the second image in a sequence of image frames with a rate multiplied by the rate multiplication section, based on (i) a determination, for the sequence of image frames with a rate multiplied, indicating a display time of frames of the first image, the first image corresponding to first half of the unit of the cinema image, is different from a display time of frames of the second image, the second image corresponding to latter half of the unit of the cinema image and (ii) a determination of whether a count value that counts the frames of the first image in the sequence of the image frames with the rate multiplied by the rate multiplication section output from the replacement section is equal to a value that is greater than twice 2n.

* * * * *